United States Patent [19]
Brimhall

[11] 3,797,882
[45] Mar. 19, 1974

[54] HYDRAULIC SYSTEM AND MECHANICAL LATCH THEREFOR

[75] Inventor: Ray S. Brimhall, Salt Lake City, Utah

[73] Assignee: Walker Bank and Trust Company

[22] Filed: Apr. 29, 1968

[21] Appl. No.: 732,484

[52] U.S. Cl.............. 296/28 C, 180/89, 292/110, 296/35 R, 298/22
[51] Int. Cl............................................ B62d 33/06
[58] Field of Search......... 296/28, 35, 35.1; 180/89; 292/110, 144, 201; 294/83, 83.1

[56] References Cited
UNITED STATES PATENTS

| | | | |
|---|---|---|---|
| 1,983,280 | 12/1934 | Flowers | 298/22 |
| 2,749,175 | 6/1956 | King et al. | 298/22 |
| 2,647,789 | 8/1953 | Chayne | 292/144 X |
| 2,868,583 | 1/1959 | Harbers et al. | 298/22 X |
| 2,939,541 | 6/1960 | Smalley | 180/89 |

Primary Examiner—Benjamin Hersh
Assistant Examiner—John A. Pekar
Attorney, Agent, or Firm—David V. Trask

[57] ABSTRACT

The present invention comprises a pressure system and latching means for determining and controlling movement of a truck-cab relative to its tractor, and, in addition, for latching the two structures together, for translational movement. The pressure system includes means not only for unlocking the latch employed but also for controlling movement and disposition of a cab relative to its tractor frame. The latch means, itself, is of importance in a variety of contexts, to provide for control at a distance of unlatching and latching together two given structures.

13 Claims, 7 Drawing Figures

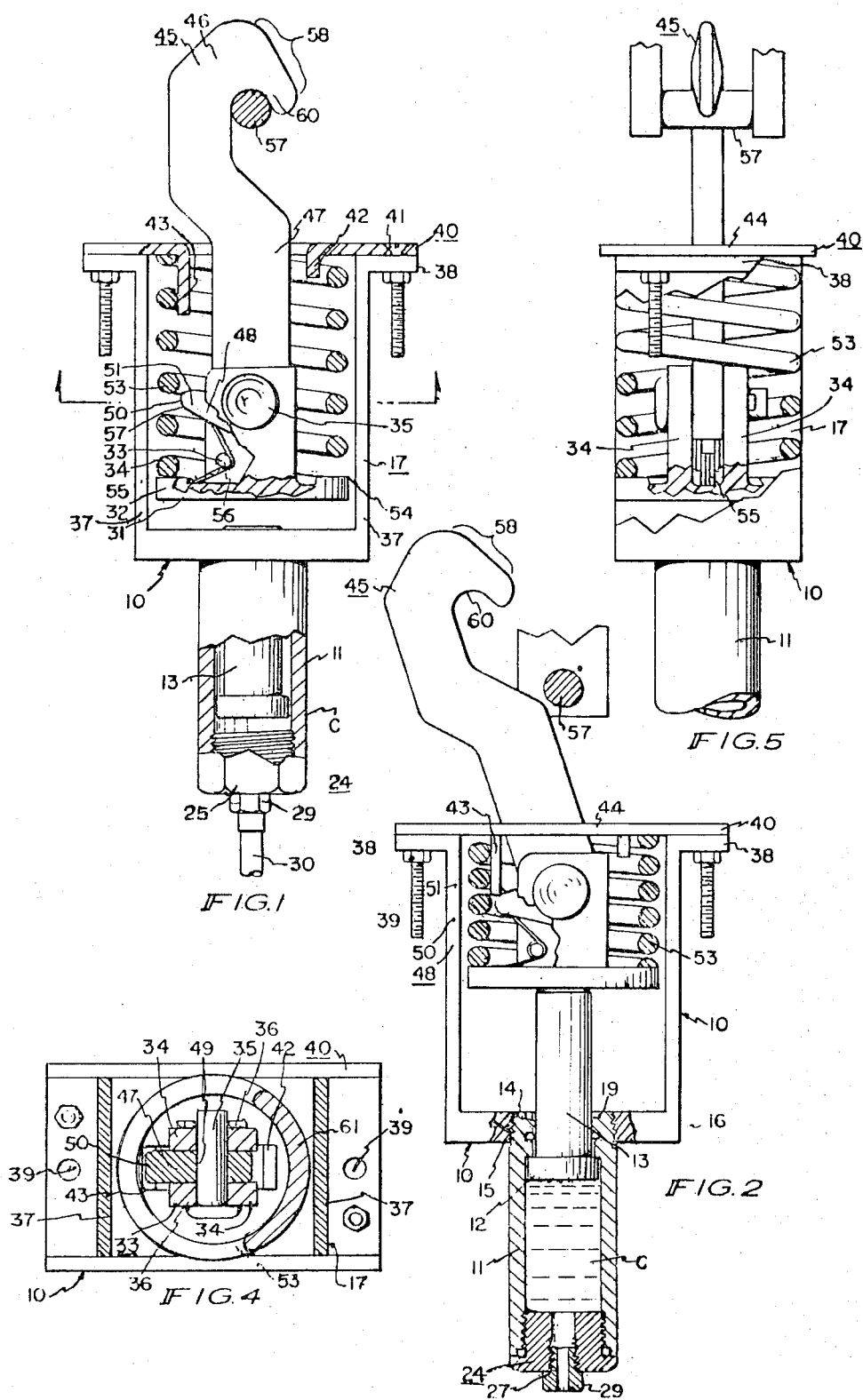

HYDRAULIC SYSTEM AND MECHANICAL LATCH THEREFOR

The present invention relates to pressure systems and latches therein, and, more particularly, to a new and improved pressure system and pressure-operated latch therein which can accomplish a variety of desirable objectives. The invention is especially applicable in the trucking art wherein cabs are releasably latched to their frames and, upon unlatching thereof, are pivotable with respect to their frames for re-work operations.

In the past a number of problems have presented themselves in connection with cabs pivoted to tractor frames. There is the ever present problem of appropriately lifting the cab, relative to the frame, for re-work and maintenance operations. Customarily, these cabs are pivoted to the frame, and suitable hydraulic means are used to selectively lift the cab relative to the frame and also to permit its descent. In the inventor's co-pending application entitled "Hydraulic Valve and System," filed Dec. 2, 1965, Ser. No. 530,242, which now U.S. Pat. No. 3,430,653 is fully incorporated herein by way of reference, the inventor has solved a number of problems in connection with cab lift, providing a novel four-way valve and system. The valve employed permits metered descent on both sides of the cab pivot in a very desirable and functional manner. The present invention is an extension of the latter invention, and in addition solves another problem area, wherein the latching means used to releasably latch the cab to the tractor frame is pressure-operated in the present invention and, indeed, is actuated by that same system which controls the movement of the cab itself. By applicant's system the unlatching of the cab is or can be accomplished at a remote point and in a very easy manner; the latch is spring-controlled and is made in such a way that latch-release is accomplished prior to the actual pressure lifting of the cab. The latch means is so constructed and arranged that cab descent automatically accomplishes cab relatch to its tractor frame, and this without any further manipulation of the artisan, if so desired.

Accordingly, the principal object of the present invention is to provide a pressure-operated latch.

A further object is to provide a pressure system incorporating a pressure-operated latch.

A further object is to provide a pressure system for moving one object relative to another and, additionally, for accomplish an unlatching of one object relative to the other prior to such movement.

A further object is to provide an improved pressure-operated latch for cab-tractors.

An additional object is to provide a pressure system for raising and lowering cabs relative to their tractor frames and, additionally, for automatically unlatching the cab relative to the frame immediately prior to cab movement control.

A further object is to provide in a pressure-operated latch suitable means for automatically displacing the latch upon pre-determined extensions thereof.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIG. 1 is a side elevation, partially section, of latching means constructed in accordance with the present invention.

FIG. 2 is a view similar to FIG. 1 but illustrates the latching means as having become unlatched from its retainer through extension of such latching means under pressure.

FIG. 4 is a horizontal section looking downwardly and is taken along the line 4—4 in FIG. 1.

FIG. 5 is an enlarged fragmentary elevation taken along the line 5—5 in FIG. 1.

in FIG. 4 the system is shown as lifting a cab relative to its frame.

in FIG. 7 the latch and retainer bar are reversed relative to their mountings to the tractor frame and cab, this to illustrate alternate forms of the invention.

Figure 6:
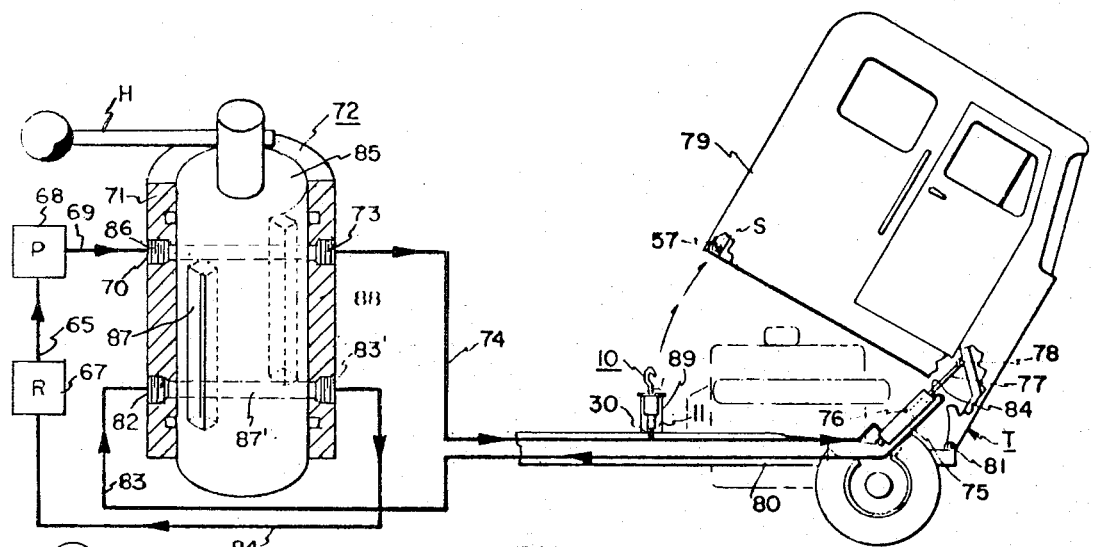
FIG. 6 is an elevation, partially in schematic form, of a pressure incorporating the principles of the present invention and the latch thereof.

In FIGS. 1 and 2 latch means 10 is pressure-operated and includes cylinder 11 and piston 12, the latter being provided with piston rod 13. Cylinder 11 includes threads 14 which threadedly engage threads 15 of the upper portion 16 of housing 17. If desired, a shoulder may be provided against which the end 19 of cylinder 11 may abut. Conventional O-ring seals may be provided for the piston, or the latter may be simply machined for close tolerance fitting within the bore of cylinder 11.

Threaded into cylinder 11 is upper portion 24 having wrench flats 25 to which a conventional wrench may be applied to secure the cylinder into housing 17. The threaded end fitting 29 threadedly engages the internal threaded bore 27 of portion 25. Threaded end fitting 29 may comprise a hydraulic or pneumatic fitting to which conduit 30 is secured.

Piston rod 13 selectively abuts flange member 31, the latter being provided with circular flange 32 and bifurcated flange extension 33. The latter may take the form of a pair of arms 34 across which and between which is mounted a pivot pin 35, through corresponding arm apertures 36.

Housing 17, in addition to including upright portion 16, is provided with opposite side walls 17 having flanges 38. The latter includes a plurality of mounting apertures 39 for mountingly receiving the mounting plate 40. Attachments 41 (not shown in FIG. 4) may be employed to accomplish the securement, if desired. Further, possible additional mounting holes, not shown, may be provided to secure the combination to the frame of a tractor or cab, for example. Mounting plate 40 will preferably include an upstanding stop 42 and also upstanding cam abutment 43. Members 42 and 43 are preferably made integral with the planar portion 44 of mounting plate 40. Mounting plate 40, of course, will include a slot 61 for translationally receiving hook portion 46 of latch 45.

Latch 45 enjoys a hook configuration, including hook portion 46 and an elongate portion 47. Portion 47 terminates in cam portion 48, the latter including a central aperture 49 for pivotally receiving pivot pin 35. Cam portion 48 includes an extension 50 providing surface 51 which abutingly engages abutment 43 of mounting plate 40. Accordingly, it is seen that an upward movement of piston 12 provides an upward thrusting of latch 45 and, ultimately, engagement of surface 51 with abutment 43. This causes a counter-clockwise rotational displacement of latch 45 about the axis of pivot pin 35.

Returning now to the completion of the latch means structure, it will be seen that a compression spring 53 is disposed between flange member 31 and mounting plate 40, the ends of the spring thrusting against the same in opposite directions. An upwardly extending lip 54 may be included in the design of flange 32 so as to offer a seat for the spring 53. A latch return spring 55 is mounted to pin 56 disposed between arms 54. Opposite extremities of the return spring 55 engage flange 32 and surface 57 of cam portion 48. This is to urge the latch 45 in a clockwise direction, for proper ultimate engagement of a retainer bar 57 as hereinafter explained. Stop 42, if used, may serve as a forward positioning stop of latch 45 to stop the movement of latch 45. It is noted that latch 45 includes the hook portion 46, the latter having a cam surface 58. Hence, upon relative movement of retainer bar 57 toward latch means 10, (see FIG. 3) or vice versa, the retainer bar 57 may thrustingly engage cam surface 58 so as to urge the hook out of the way and thus allow the re-latching of retainer bar 57 by hook portion 46 in the manner hereinafter set forth.

The structure as thus far described operates as follows: The latch means 10 is pressure-operated, hydraulically or pneumatically, with chamber C of cylinder 11 receiving the pressure fluid through conduit 30. In the absence of the existence of pressure chamber C, then compression spring 53 returns flange 32 downwardly so that piston 12 assumes a lower position within cylinder 11. At this point it is presumed that the hook-configured latch 45 is engaged with retainer bar 57. (In this connection, when the invention is utilized with a cab lift on a tractor, then the latch means will either be mounted to a cab and the retainer bar to the frame of the tractor, or vice versa). Assume at this point that there is to be an unlatching of the cab relative to the tractor frame so that there will be enabled a mutual vertical separation of retainer bar 57 of latch 45. In such event pressure will be applied by a conduit 30 to chamber C so as to thrust the piston 12 upwardly. This produces a corresponding upward movement of latch 45 so that the latter becomes disengaged with retainer bar 57; at this point, and during the continued upward movement of latch 45 and bar 57 relative to latch means 10, the cam surface 51 of latch 45 comes in contact with abutment 43. The latter produces a counter-clockwise movement of latch 45 through the relative downward urging of surface 51 by abutment 43. This is produced about pivot pin 35. Thus, the latch 45 will be swung to the left of retainer bar 57 so as to accomplish a separation between the planes of relative movement of retainer bar 57 and latch 45. When a desired distance has been achieved relative to latch means 10 of retainer bar 45, then pressure is reduced in chamber C and the latch 45 returns to its vertical configuration under the pressure of spring 55 acting upon surface 57.

For re-engagement of the latch 45 with retainer bar 57, the two are urged mutually together, either through the descent of the latch means 10 to retainer bar 57, or vice versa (as shown), depending upon the structure used, until surface 58 is engaged by the lower portion of retainer bar 57. Further downward movement of the retainer bar 57 against latch means 10 causes a camming to the left of hook portion 56, by retainer bar 57 pressing against surface 58. This camming action overcomes the force of return spring 55 so as to rotationally displace latch 45 to the left. Once retainer bar 57 rides over surface 58, then the retainer bar will fall in place within its cradle 60. Circular compression spring 53 will then force flange 32 downwardly so as to provide a pressured engagement between latch 45 and retainer bar 57.

It is believed that the use of mechanical means to serve as stop 42 and abutment 43 is preferred. As to the latter, i.e., abutment 43, and its action upon cam 48, hydraulic or pneumatic means may be used as well for lateral latch displacement of latch 45. However, simple mechanical means as is shown in the preferred embodiment in FIG. 1 is preferred.

In FIG. 6, means 65 provides for fluid flow between reservoir 67 and pressure source such as pump 68. (The embodiment illustrate use of the invention with a hydraulic system. It will be understood that a pneumatic system may be used equally as well.) Conduit 69 from pump 68 is connected to port 70 of valve body 71 of positioning valve 72. Port 73 is connected by suitable conduit 74 leading to cab lift cylinder 75, on one side of piston 76 thereof. Piston 76 includes a conventional piston rod 77 which is pivoted at 78 to cab 79. Cab 79 is itself pivoted to tractor frame 80 by pivot means 81. Valve port 82 is connected by conduit 83 to point 84 on cylinder 75 on the opposite side of piston 76; the latter comprises a double-acting piston. Connected into the conduit 74 by means of a tee is line 30 leading to cylinder 11 of latch means 10. Latch means 10 is securely mounted to frame 80 in the embodiment shown in FIG. 6. Port 83' of valve body 71 is connected by conduit 84 to reservoir 67. The valve gate 85 includes through-apertures 86 and 87' for supplying respective communication between ports 70 and 73 and also between ports 82 and 83' (in the condition shown in FIG. 6). In this configuration the ports are connected by the valve gate so that there is an upward movement of piston 76 and piston rod 77, corresponding to an upper or clockwise rotational displacement of cab 79.

The valve 72 is a three-position valve, with the position shown in FIG. 6 indicating a forward-pressure action against piston 76 so as to lift the cab 79, and, if desired, extend the same over-center. The valve 72 will be so designed as shown, such that valve may assume a completely turned-off position, as through a counter-clockwise rotation of the valve gate relative to the valve body, so that no conduction through the valve will occur.

Figure 7:
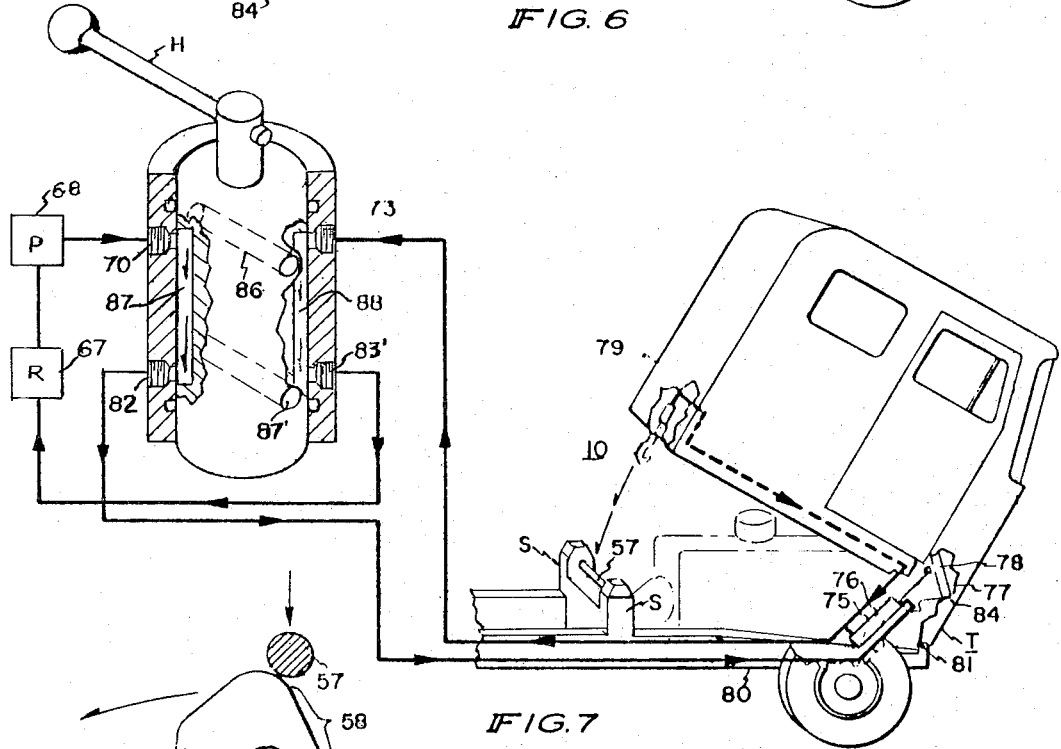
FIG. 7 is a view similar to FIG. 6 and illustrates a return of a cab to its frame.

FIG. 6 has illustrated a first conduction of the valve 72. FIG. 7 indicates another conductive condition wherein the apertures 86 and 87' are moved out of registry with the valve body parts and wherein, in addition, longitudinal surface slots 87 and 88 are brought into registry between ports 70 and 82 and also between ports 73 and 83'. In such event there will be a flow as indicated by the arrows seen in FIG. 7, wherein the slots 87 and 88 shunt the fluid across the valve gate in the patterns indicated. In such event there will be a descent of piston 76 and a corresponding progressive return of cab 79 to its original horizontal position.

Of course, where a pneumatic system is involved the pump 68 will comprise a compressor, with the reservoir being simply the gaseous store of outside atmosphere.

FIG. 6 illustrates the latch means 10 as being physically mounted by structural means 89 to frame 80 of tractor T. In such event the retainer bar 57 of FIG. 1 may be securely affixed to cab 79 by any conventional means.

In a slightly different embodiment of the invention, FIG. 7 illustrates that the retainer bar 57 can be secured to the frame by conventional means, whereas a latch means 10 will be secured to cab 79.

Whether the latch means 10 is secured to the frame of the towing vehicle or tractor, or whether it will be secured to cab 79, suitable apertures 42 may be used for accommodating the attachments 89. In any event, retainer bar 57 may be welded or otherwise secured to structural members S of frame 80 of tractor T. Handle H is shown schematically and indicates mechanical means which, if desired for use, may be used to rotationally displace valve gate 85 within valve body 71.

The structure shown in FIGS. 6 and 7 operates as follows: Pressured fluid as introduced through ports 70 is directed through port 73 to the lower side of cylinder 75, this to act upon piston 76 in urging the cab upwardly in a clockwise direction about its pivot 81. The latch means 10 is so designed that it operates in the manner seen in FIGS. 1 through 3, so that the latch 45 will be disposed out of the way with respect to retainer bar 57, see FIG. 2, at that point at which sufficient pressure builds up within cylinder 75 to commence to move cab 79. This sequence of operation can be controlled through the proper selection of the spring constant of spring 53, and this in turn will depend upon the weight of the specific cab involved. In any event, upon release of latch 45 from retainer bar 57 as indicated in FIG. 2, the cab will be lifted and continuously progressed in a clockwise direction about pivot 81 until the valve 72 is turned to "Off" position.

When descent of the cab is desired, then handle H is turned so that the valve gate 85 rotates within valve body 71 to achieve the disposition shown in FIG. 7. At this point the slots 87 and 88 come in line with ports 70, 82, and ports 73, 83', so that there is a reverse-flow condition produced. Thus, the piston 76 within cylinder 75 descends downwardly, permitting a return of the cab and a cammed engagement of cam surface 58 of latch 45 with retainer bar 57 during such descent. After the descent is substantially completed the pressure of return spring 55 returns latch 45 to the position shown in FIG. 1.

As seen in FIG. 6 there is substantially no pressure build-up on the output side of the valve, since the fluid return through conduit 74 is on the reservoir-side of the system. In such event, there will be no sideways displacement of latch 45 during cab descent. However, the valve can take the configuration as shown in the inventor's co-pending United States Patent Application, entitled "Hydraulic Valve and System," Ser. No. 530,242, filed Dec. 2, 1965, wherein there is a metering effect of the valve by virtue of the latter's construction on the output side of the valve. In such event some pressure will exist in the chamber C of cylinder 11 so as to produce an extension of the latch and its sideways displacement through the engagement of abutment 43 with cam surface 51 of latch 45. In any event, upon complete descent the latch will return to its initial position and engage the retainer bar, and also, in either event, the construction provides means for accommodating a suitable re-engagement of retainer bar 57 with latch 45.

What is thus provided is a novel latching means, hydraulically or pneumatically operated, by which two structures, such as a cab and a tractor frame, may be releasedly secured together. Release of one relative to the other is hydraulically or pneumatically effectuated in the manner as described. The latch means is ideally used in the four-way valve hydraulic system of the present invention, and in the hydraulic system shown in the applicant's co-pending case above referenced, wherein the pressure means used to actuate the cab lift is also employed to accommodate latch release. Latch re-engagement is easily facilitated through the mechanical structure employed in the latching means and/or through proper pressure operation of the latter in accordance with the above description.

Figure 3:
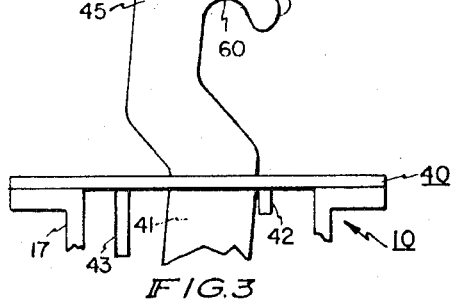
FIG. 3 is similar to FIGS. 1 and 2 but illustrates a closing of the latch means relative to its retainer to accomplish a re-latching of the mechanical structure involved.

While conceivably the piston rod 13 could be directly connected to flange member 31, it is preferable that both members be simply cooperatively, abuttingly disposed as indicated in FIGS. 1 and 3. Where the latch 45 is hooked to retainer bar 57 and the piston 13 within cylinder 11 withdrawn (by normal operation as through a reduction in operating pressure and by the return spring 53) so as to allow for a possible ultimate spacing between the end of piston rod 13 and the adjacent surface of flange member 31 through normal vibration during road travel, then compression spring 53 provides for a springingly-retained connection between the latch and the structure to which retainer bar 57 is mounted. It will be noted that this is provided without any continuous bumping or other interference of the flange member 31 with the piston or piston rod (which would otherwise cause seal wear), or surrounding housing 17.

While particular embodiments of the present invention have been shown and described, it will be obvious to those skilled in the art that changes and modifications may be made without departing from this invention in its broader aspects.

It is claimed:

1. A pressure-fluid operated latching mechanism including, in combination, a pressure cylinder, a housing means affixed to said pressure cylinder, a piston disposed within said cylinder, means connected to said cylinder for selectively applying fluid pressure to said piston to translate the same forwardly within said cylinder, means for returning said piston rearwardly within said cylinder when said fluid pressure is released, and latching means disposed in said housing means and cooperably disposed with respect to said piston, and extensible from and withdrawable toward said cylinder along the latter's longitudinal axis in response to movement of said piston, for releasably engaging an external member, said housing means including means for tilting said latching means away from said longitudinal axis upon pre-determined travel of the latter.

2. Structure according to claim 1 wherein said latching means comprises a concave hook-configured latch.

3. A pressure-fluid operated latching mechanism including, in combination, a pressure cylinder, a piston disposed within said cylinder, means connected to said cylinder for selectively applying fluid pressure to said piston to translate the same forwardly within said cylinder, means for returning said piston rearwardly within said cylinder when said fluid pressure is released, and latching means cooperably disposed with respect to said piston, and extensible from and withdrawable toward said cylinder in response to movement of said piston, for releasably engaging an external member, and wherein said cylinder includes a housing, said piston including a piston rod protruding into said housing, said mechanism including a flange member disposed within said housing and having a flange proximate said piston rod and engageable thereby upon advancing movements by the latter, said flange member also including a flange extension integral with said flange and pivoted to said latching means at a pivot, said housing including reaction means disposed between said latching means and said cylinder, said returning means comprising a compression spring operably disposed between said flange and said reaction means.

4. Structure according to claim 3 wherein said flange member is separate from said piston rod and is constructed and arranged to be spaced therefrom when said latch latches an external member and when said fluid pressure is released from within said cylinder.

5. Structure according to claim 3 wherein said mechanism includes intercooperable means respectively integral with said housing and latching means for pivotally displacing said latching means in the process of the latter's extension from said cylinder.

6. Structure according to claim 5 wherein said pivotally displacing means comprises an actuating protuberance integral with said housing and a laterally extending camming protuberance integral with said latching means and actuatably engageable by said actuating protuberance, during the course of said latching means' extension.

7. Structure according to claim 6 wherein said reaction means comprises a plate, said actuating protuberance being affixed to and upstanding from said plate toward said cylinder within said compression spring.

8. Structure according to claim 7 wherein said mechanism includes: return spring means for spring-biasing said latching means to said flange extension about said pivot, and limit stop means for limiting the pivotal travel of said latching means about said pivot under the pressure of said return spring.

9. In combination, a tractor having a frame and a cab pivoted to said frame, one of said frame and cab having a latchable member and the remaining having fluid-pressure operated latching means, fluid-pressure operated means secured to and between said frame and said cab for pivotally, liftingly displacing said cab relative to said frame, said fluid-pressure operated latching means being coupled to said fluid-pressure operated means and being constructed for securing said latchable member by said latching means and, thereby, said cab to said frame when fluid pressure is released, and, when fluid pressure is applied, having first means for first separating said latching means from said latchable member in the direction of the travel path of said latchable member when said cab is subsequently elevated and, then, having second means for subsequently moving said latching means laterally beyond the travel path of said latchable member as said cab is being elevated.

10. In combination, a tractor having a frame and a liftable member pivoted to said frame, one of said frame and liftable member having a latchable member and the remaining having fluid-pressure operated latching means, fluid-pressure operated means secured to and between said frame and said liftable member for pivotally, liftingly displacing said liftable member relative to said frame, said fluid-pressure operated latching means being coupled to said fluid-pressure operated means for securing said latchable member by said latching means and, thereby, said liftable member to said frame when fluid pressure is released and, when fluid pressure is applied, having first means for first separating said latching means from said latchable member in the direction of the travel path of said latchable member when said liftable member is subsequently elevated and then having second means for subsequently moving said latching means laterally beyond the travel path of said latchable member as said liftable member is being elevated.

11. A pressure-fluid operated latching mechanism including, in combination, a cylinder, a housing affixed to and extending axially from said cylinder, a piston operably disposed in said cylinder and having a piston rod extending from said cylinder within said housing, a flange member disposed in said housing and having a flange disposed for engagement by said piston rod and a flange extension, a latch pivoted to said flange extension and extending beyond said housing, a compression spring axially disposed with respect to said piston rod and operably disposed between said flange and said housing and disposed within the latter, said housing and latching means being provided with intercooperable means for pivoting said latching means relative to said flange extension after a predetermined travel advancement of said latching means relative to said housing.

12. Structure according to claim 11 wherein said mechanism includes return spring means engaging said latching means for returning said latching means against prior pivoted displacement, and stop reaction means for limiting such return.

13. A pressure-fluid operated latching mechanism including, in combination, a fluid pressure cylinder having a central axis, a housing affixed to said cylinder, a reciprocating piston disposed within said cylinder and having an extension extending axially in one direction with respect to said cylinder and within said housing, latching means for engaging an external member, said latching means being disposed in said one direction beyond said piston extension, means cooperable with said piston extension and said latching means for advancing said latching means in said one direction, during times of piston and piston extension travel in said one direction, and respective, mutually intercooperable means disposed on said latching means and said housing for displacing said latching means laterally from the axis of said cylinder when a predetermined forward advance by said latching means has been reached.

* * * * *